United States Patent [19]

Schuyler

[11] Patent Number: 5,315,256

[45] Date of Patent: May 24, 1994

[54] FAULT DETECTION CIRCUIT FOR USE IN DETERMINING THE EXISTENCE OF A FAULT IN ANY ONE OF A PLURALITY OF DC LOADS

[75] Inventor: Martin Schuyler, Hastings-On-Hudson, N.Y.

[73] Assignee: Cox & Company, Inc., New York, N.Y.

[21] Appl. No.: 982,398

[22] Filed: Nov. 27, 1992

Related U.S. Application Data

[63] Continuation-in-part of Ser. No. 703,005, May 20, 1991, Pat. No. 5,168,236.

[51] Int. Cl.⁵ .............................................. G01R 31/02
[52] U.S. Cl. .................................... 324/511; 324/510; 324/158 MG; 340/661; 361/90
[58] Field of Search .............. 324/509, 510, 511, 522, 324/525, 526, 537, 541, 544, 545, 549, 705, 706, 725, 107, 158 MG; 340/649, 650, 661; 361/88, 90, 91

[56] References Cited

U.S. PATENT DOCUMENTS

| | | | |
|---|---|---|---|
| 1,523,803 | 1/1925 | Goodwin, Jr. | 324/509 |
| 2,700,125 | 1/1955 | King et al. | 324/509 X |
| 4,814,931 | 3/1989 | Kugelman et al. | 361/91 X |
| 4,823,227 | 4/1989 | Grant | 361/90 |
| 4,999,730 | 3/1991 | Pickard | 361/90 X |

OTHER PUBLICATIONS

Darold K. Smith, "Monitor Guards Three Ways Against Power Failures", Oct. 27, 1969, p. 97; *Electronics*.

Primary Examiner—Gerard R. Strecker
Assistant Examiner—Diep Do

[57] ABSTRACT

A fault detection circuit for a plurality of DC loads uses a reference load as a benchmark. The voltages at the centerpoints of the loads to be monitored are monitored and compared with the voltage of the centerpoint of the reference load. The comparison is affected by faults which do not affect all loads equally (as by a short or open) and is unaffected by faults which do affect all loads equally (as by changes in voltage of the source).

13 Claims, 2 Drawing Sheets

FAULT DETECTION CIRCUIT FOR USE IN DETERMINING THE EXISTENCE OF A FAULT IN ANY ONE OF A PLURALITY OF DC LOADS

CROSS-REFERENCE TO RELATED APPLICATION

This application is a continuation-in-part of commonly owned allowed application Ser. No. 07/703,005, filed May 20, 1991, U.S. Pat. No. 5,168,236. The entire disclosure of this parent case, including the drawings, is hereby incorporated herein as if fully set forth.

BACKGROUND OF THE INVENTION

The parent application hereto discloses a fault detection circuit for use with multi-phase loads, such as anti-icing or deicing heaters on aircraft The there-disclosed fault detection circuit operates by comparing the voltage at the centerpoint of a reference load with the voltages at the centerpoints of the loads to be monitored.

For certain aeronautical applications, heaters are powered by 270 VDC. It would be advantageous to provide fault detection circuitry which would work in such an environment.

One object of the invention is to provide a fault detection circuit for determining the existence of a fault in any one of a plurality of loads which are supplied by a DC source.

Another object is to provide such a circuit which is highly sensitive to faults in the loads and highly insensitive to changes in the source.

A further object is to provide such a circuit which does not require the use of many conductors which must be routed out of the loads.

Still a further object is, in general, to improve on prior art circuits of this general type.

In accordance with the invention, the DC loads to be monitored are center-tapped. A reference center-tapped load is connected across the DC source and the reference centerpoint of that reference load is used as a benchmark. The voltages at the centerpoints of all the loads to be monitored are compared against the voltage of the centerpoint of the reference load. When the voltage at any centerpoint of a monitored load is substantially unequal to the voltage at the centerpoint of the reference load, this indicates a load fault.

BRIEF DESCRIPTION OF THE DRAWINGS

The invention will be better understood with reference to the illustrative and non-limiting drawings, in which.

DETAILED DESCRIPTION OF PREFERRED EMBODIMENTS

Figure 1:
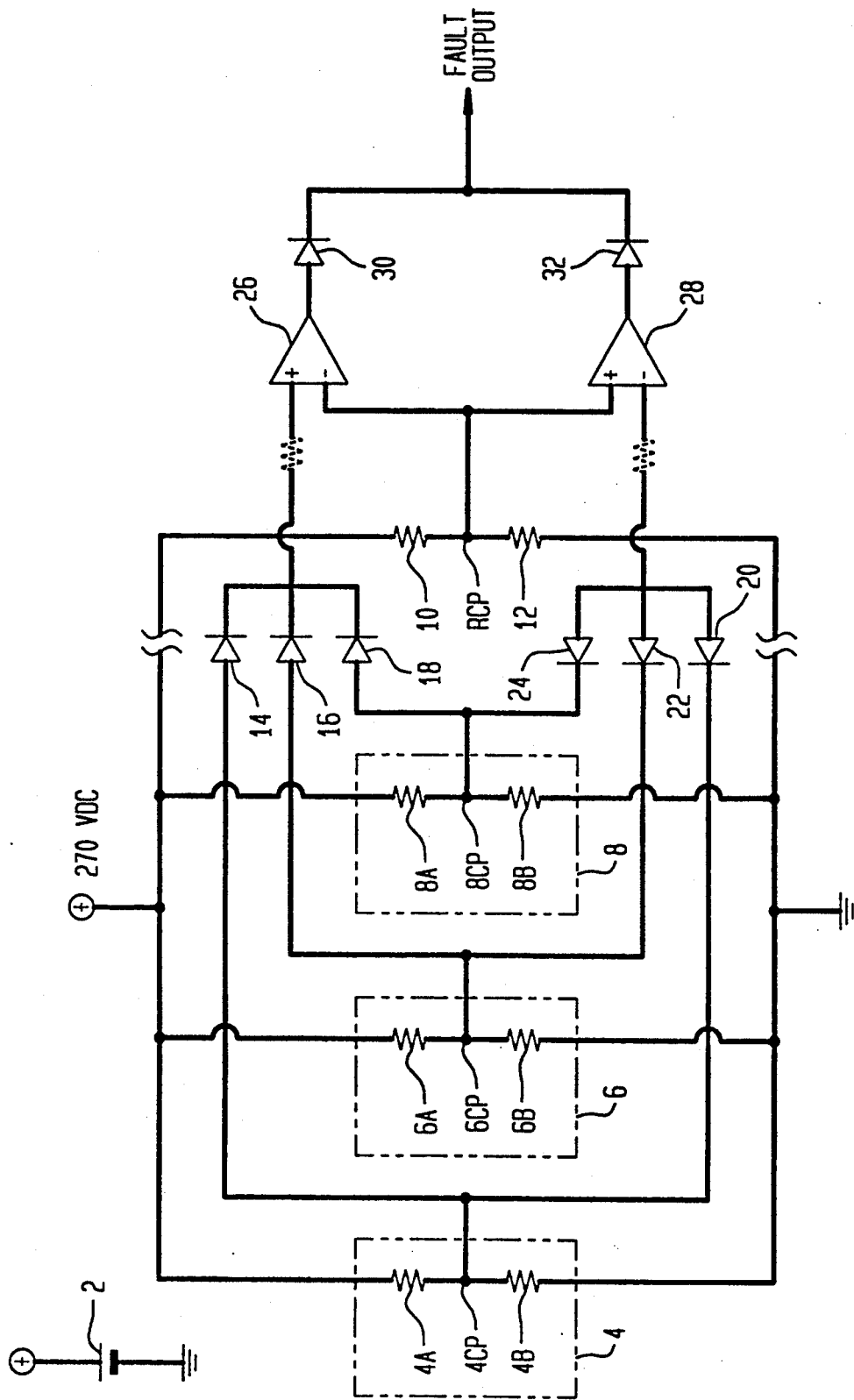
FIG. 1 is a schematic diagram of a preferred embodiment of the invention.

Referring first to FIG. 1, a 270 VDC source 2 in, e.g., an airplane (not shown) is used to power loads 4, 6 and 8. In this example, the loads 4, 6 and 8 may be heaters such as fairing heaters or wing heaters, but it will be understood that the invention does not reside in the particular application for the load and that the named applications are only exemplary. It will also be understood that the invention does not reside in the use of three loads; any number can be monitored. It will further be understood that the loads 4, 6 and 8 need not be the same.

In accordance with the invention, each of the loads 4, 6 and 8 is center-tapped. This divides load 4 into subloads 4A and 4B, which are connected at centerpoint 4CP. Likewise, load 6 is divided into subloads 6A and 6B that are connected at centerpoint 6CP, and load 8 is divided into subloads 8A and 8B that are connected at centerpoint 8CP. Each subload may be made up of a plurality of circuits in parallel.

A center-tapped reference load is constructed of two like resistors 10 and 12 which are connected across the source 2. The resistor 10 is connected to the resistor 12 at the reference centerpoint RCP.

To monitor the voltages at the centerpoints 4CP, 6CP and 8CP, a network of diodes 14, 16, 18, 20, 22, and 24 is used. The cathodes of diodes 14, 16 and 18 are all connected together. The anode of diode 14 is connected to centerpoint 4CP, the anode of diode 16 is connected to centerpoint 6CP, and the anode of diode 18 is connected to centerpoint 8CP. Similarly, the anodes of diodes 20, 22 and 24 are all connected together. The cathode of diode 20 is connected to centerpoint 4CP, the cathode of diode 22 is connected to centerpoint 6CP, and the cathode of diode 24 is connected to centerpoint 8CP.

To compare the voltages at the centerpoints 4CP, 6CP and 8CP with the voltage at the reference centerpoint RCP, two operational amplifiers 26 and 28 are used. These operational amplifiers 26, 28 are powered by the source 2 (power connections are not shown.) The inverting input of the operational amplifier 26 is connected to the non-inverting input of the operational amplifier 28, and both connected inputs are further tied to the reference centerpoint RCP. The non-inverting input of the operational amplifier 26 is connected to the cathodes of the diodes 14, 16 and 18; the inverting input of the operational amplifier 28 is connected to the anodes of the diodes 20, 22 and 24. (It will be noted that in FIG. 1, a resistor shown in dotted lines is in series between the non-inverting input of the operational amplifier 26 and the diodes 14, 16 and 18, and that a like resistor shown in dotted lines is in series between the inverting input of the operational amplifier 28 and the diodes 20, 22 and 24. For now, these resistors will not be discussed; the function of these resistors will be explained after the operation of the other circuit elements has been described.)

When all the loads are operating properly, the voltages at centerpoints 4CP, 6CP and 8CP will all be equal to the voltage at reference centerpoint RCP. There will be no output from either of the operational amplifiers 26, 28 because the voltages at their inverting and non-inverting inputs will then be the same. This will be true even if the voltage of the source 2 fluctuates, because the voltages at all the centerpoints 4CP, 6CP 8CP and RCP will then fluctuate together.

However, if subload 4A develops a fault, i.e. is shorted or opened, the voltage at centerpoint 4CP will be either zero (open fault case) or 270 VDC (short fault case). If the voltage at centerpoint 4CP is 270 VDC (short fault case), operational amplifier 26 will produce an output because 270 VDC will forward-bias the diode 14. If the voltage at centerpoint 4CP is zero (open fault case), operational amplifier 28 will produce an output because zero VDC will forward-bias the diode 20. This will cause operational amplifier 28 to produce a non-zero output. The same is true for the other subloads;

when any of the subloads 4B, 6B or 8B are open, or when any of the subloads 4A, 6A or 8A are shorted, the operational amplifier 26 will produce an output. Likewise, when any of the subloads 4A, 6A or 8A are open, or when any of the subloads 4B, 6B or 8B are shorted, the operational amplifier 28 will produce an output. Thus, any short or open load fault will produce a nonzero output from one of the operational amplifiers 26, 28. (It is possible that a subload may change resistance without shorting or opening. If this happens, the fault will cause one of the operational amplifiers 26, 28 to produce a nonzero output, but this eventuality is unlikely; shorting or opening is much more common.) Advantageously although not necessarily, the outputs of the operational amplifiers 26, 28 may be connected together through diodes 30, 32 respectively so that any fault is reflected in a single fault signal output. The diodes 30, 32 serve to isolate the outputs of the operational amplifiers 26, 28 from each other. Additionally, since the diodes 30, 32 will not produce outputs unless the voltages at the outputs of operational amplifiers 26, 28 exceed the threshold voltage needed to render the diodes 30, 32 conductive, the diodes 30, 32 prevent small outputs from the operational amplifiers 26, 28 from reaching subsequent circuitry and being considered as fault signals.

Most operational amplifiers would not remain operative with 270 VDC at one of their inputs. Accordingly, the resistors shown in dotted lines are used to limit the voltages at the non-inverting input of the operational amplifier 26 and the inverting input of the operational amplifier 28 when a fault takes place.

The invention only requires one connection to each of the loads to be monitored. Because of this, little real estate on the loads is required. This is important because the surfaces of the loads are taken up with resistive circuits and temperature sensors and any space which is taken up by the monitoring function decreases the space available for the functions which the loads must perform.

Figure 2:
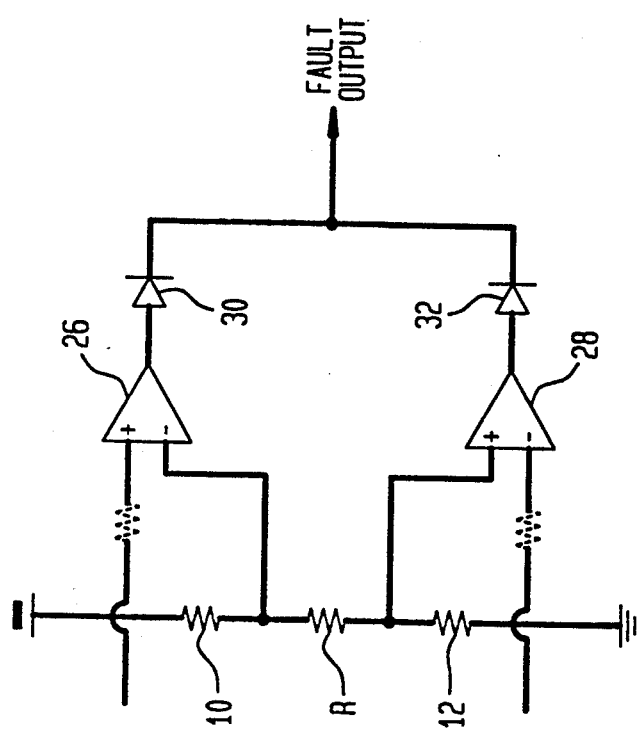
FIG. 2 is a schematic diagram of an advantageous modification of the preferred embodiment.

The modification shown in FIG. 2 is advantageous because it establishes a minimum threshold below which no positive fault output signal will be output by the operational amplifiers 26, 28. In this modification, a small bias resistor R is placed in series between resistors 10 and 12. The inverting input of the operational amplifier 26 is connected to the common junction point of resistors 10 and R and the non-inverting input of the operational amplifier 28 is connected to the common junction point of resistors R and 12.

The small bias resistor R biases the inputs of each of the operational amplifiers 26, 28 so that the voltage at each inverting input is slightly greater than the voltage at each corresponding non-inverting input. This in turn produces slight negative voltages at the outputs of each of the operational amplifiers 26, 28 when all the loads 4, 6 and 8 are operating correctly. As a result of this, a positive fault output signal will only appear at the outputs of each of the operational amplifiers 26, 28 when the small input differentials at their inputs have been overcome.

The invention does not require any particular comparison scheme for the voltages at the centerpoints of the loads to be monitored, and the operational amplifiers may be provided with circuitry which causes them to generate fault outputs only when the inequality at their inputs exceeds a predetermined threshold. Alternatively, comparators may be used instead of operational amplifiers; persons skilled in the art can readily adapt the invention to particular applications by choosing appropriate comparison algorithms.

Additionally, although the preferred embodiment uses center-tapped loads, this is merely for convenience. The taps may be off-center as long as the ratios of the resistances of the subloads are constant; in the example presented, the preferred embodiment would work properly as long as the ratios R(4A)/R(4B), R(6A)/R(6B), R(8A)/R(8B) were all equal to the ratio R(10)/R(12), R(x) indicating the resistance of the respective subload or resistor. The term "centerpoint" as used herein encompasses such equi-ratio tapping schemes.

Although a preferred embodiment has been described above, the scope of the invention is limited only by the following claims:

I claim:

1. A fault detection circuit for determining the existence of a fault in any one of a plurality of center-tapped loads which are supplied by a DC source, comprising:
   a center-tapped reference load having two equal resistances connected to a floating reference centerpoint, each resistance being connected to a corresponding side of the source;
   means for monitoring the voltages at the centerpoints of all the center-tapped loads to be monitored; and
   means for comparing said monitored voltages with the voltage of said reference centerpoint.

2. The circuit of claim 1, wherein said comparing means operates in a manner that a fault output signal is produced when any of said monitored voltages is substantially unequal to the voltage of said reference centerpoint.

3. The circuit of claim 1, wherein said monitoring means comprises two sets of diodes each having a number of diodes which equals the number of loads to be monitored, the first set of diodes having all their cathodes connected together and the second set of diodes having all their anodes connected together, and each diode in each set having an electrode which is connected to a corresponding one of the centerpoints of a center-tapped load to be monitored.

4. A fault detection circuit for determining the existence of a fault in any one of a plurality of center-tapped loads which are supplied by a DC source, comprising:
   a center-tapped reference load having two equal resistances connected to a floating reference centerpoint, each resistance being connected to a corresponding side of the source;
   means for monitoring the voltages at the centerpoints of all the center-tapped loads to be monitored, said means comprising
   a) a first set of n diodes, n being an integer equal to the number of loads of be monitored, all diodes in the first set having their cathodes connected together and each diode in the first set having its anode connected to the centerpoint of a corresponding single one of the loads to be monitored,
   b) a second set of n diodes, all diodes in the second set having their anodes connected together and each diode in the second set having its cathode connected to the centerpoint of a corresponding single one of the loads to be monitored; and
   means for comparing said monitored voltages with the voltage of said reference centerpoint.

5. The circuit of claim 4, wherein said comparing means comprises first and second operational amplifiers, the inverting input of the first operational amplifier and the non-inverting input of the second operational amplifier being both connected to said reference centerpoint, the cathodes of the first set of diodes being connected to the non-inverting input of the first operational amplifier, and the anodes of the second set of diodes being connected to the inverting input of the second operational amplifier.

6. The circuit of claim 5, wherein the outputs of the first and second operational amplifiers are connected together.

7. The circuit of claim 4, wherein said comparing means comprises first and second comparators each having first and second inputs, the first input of the first comparator and the second input of the second comparator being both connected to said reference centerpoint, the cathodes of the first set of diodes being connected to the second input of the first comparator, and the anodes of the second set of diodes being connected to the first input of the second comparator.

8. The circuit of claim 7, wherein the outputs of the first and second comparators are connected together.

9. A fault detection circuit for determining the existence of a fault in any one of a plurality of center-tapped loads which are supplied by a DC source, comprising:
a reference load network having two equal resistances connected in series with each other through a small bias resistor, each of the two equal resistances being connected to a corresponding side of the source;
means for monitoring the voltages at the centerpoints of all the center-tapped loads to be monitored, said means comprising
a) a first set of n diodes, n being an integer equal to the number of loads of be monitored, all diodes in the first set having their cathodes connected together and each diode in the first set having its anode connected to the centerpoint of a corresponding single one of the loads to be monitored,
b) a second set of n diodes, all diodes in the second set having their anodes connected together and each diode in the second set having its cathode connected to the centerpoint of a corresponding single one of the loads to be monitored; and
means for comparing said monitored voltages with the voltages at the ends of the small bias resistor.

10. The circuit of claim 9, wherein said comparing means comprises first and second operational amplifiers, the inverting input of the first operational amplifier and the non-inverting input of the second operational amplifier being each connected to a corresponding end of the small bias resistor, the cathodes of the first set of diodes being connected to the non-inverting input of the first operational amplifier, and the anodes of the second set of diodes being connected to the inverting input of the second operational amplifier.

11. A fault detection circuit for determining the existence of a fault in any one of a plurality of center-tapped loads which are supplied by a DC source, comprising:
a reference load network having two equal resistances connected in series with each other through a small bias resistor, each of said two equal resistances being connected to a corresponding side of the source;
means for monitoring the voltages at the centerpoints of all the center-tapped loads to be monitored; and
means for comparing said monitored voltages with the voltages at the ends of said small bias resistor.

12. A fault detection system for use with a DC source, comprising:
a plurality of center-tapped loads;
a center-tapped reference load having two equal resistances connected to a floating reference centerpoint, each resistance being connected to a corresponding side of the source;
means for monitoring the voltages at the centerpoints of all the center-tapped loads to be monitored; and
means for comparing said monitored voltages with the voltage of said reference centerpoint.

13. A fault detection system for use with a DC source, comprising:
a plurality of center-tapped loads;
a reference load network having two equal resistances connected in series with each other through a small bias resistor, each of said two equal resistances being connected to a corresponding side of the source;
means for monitoring the voltages at the centerpoints of all the center-tapped loads to be monitored; and
means for comparing said monitored voltages with the voltages at the ends of the small bias resistor.

* * * * *